United States Patent [19]

Kong

[11] Patent Number: 6,072,859
[45] Date of Patent: Jun. 6, 2000

[54] APPARATUS AND METHOD OF GENERATING VOICE MESSAGE OF CALLER'S NUMBER IN CASE OF INCOMING CALL IN TELEPHONE

[75] Inventor: Tae-Ho Kong, Gumi, Rep. of Korea

[73] Assignee: SamSung Electronics Co., Ltd., Kyungki-do, Rep. of Korea

[21] Appl. No.: 08/777,719

[22] Filed: Dec. 20, 1996

[30] Foreign Application Priority Data

Dec. 22, 1995 [KR] Rep. of Korea ................ 95-54743

[51] Int. Cl.[7] ............... H04M 1/57; H04M 1/56; H04M 1/21
[52] U.S. Cl. .................. 379/88.16; 379/88.21; 379/88.19; 379/142; 379/374; 379/376
[58] Field of Search ................. 379/67, 88, 89, 379/142, 372, 373, 374, 375, 376, 67.1, 88.16, 88.19, 88.21

[56] References Cited

U.S. PATENT DOCUMENTS

| | | | |
|---|---|---|---|
| 4,582,956 | 4/1986 | Doughty | 379/142 |
| 4,879,743 | 11/1989 | Burke et al. | 379/142 |
| 4,894,861 | 1/1990 | Fujioka | 379/374 |
| 4,899,358 | 2/1990 | Blakley | 379/374 |
| 4,922,490 | 5/1990 | Blakley | 379/374 |
| 5,265,145 | 11/1993 | Lim | 379/88 |
| 5,349,638 | 9/1994 | Pitroda et al. | 379/142 |
| 5,390,236 | 2/1995 | Klausner et al. | 379/67 |
| 5,426,422 | 6/1995 | Vanden Heuvel et al. | 379/354 |
| 5,475,743 | 12/1995 | Nixon et al. | 379/113 |
| 5,481,595 | 1/1996 | Ohashi et al. | 379/67 |
| 5,524,140 | 6/1996 | Klausner et al. | 379/67 |
| 5,526,406 | 6/1996 | Luneau | 379/142 |
| 5,533,102 | 7/1996 | Robinson et al. | 379/67 |
| 5,541,988 | 7/1996 | Draganoff | 379/354 |
| 5,574,777 | 11/1996 | Lewis | 379/142 |

FOREIGN PATENT DOCUMENTS

| | | |
|---|---|---|
| 0624-966a2 | 11/1994 | European Pat. Off. . |
| 62-188539 | 8/1987 | Japan ............. 379/375 |
| 2210755 | 6/1989 | United Kingdom ........ 379/374 |
| WO 95/05045 A1 | 2/1995 | WIPO . |
| WO 96/27974 A1 | 12/1996 | WIPO . |

OTHER PUBLICATIONS

"Speech–Synthesis Telephone Call Annunciator," IBM Technical Disclosure Bulletin, vol. 31, No. 8. pp. 261–264, Jan. 1989.

*Primary Examiner*—Daniel S. Hunter
*Attorney, Agent, or Firm*—Robert E. Bushnell, Esq.

[57] ABSTRACT

An apparatus for generating a voice message for a caller's telephone number in case of an incoming call in a telephone may include detecting means for detecting a ringing signal, and receiving means for receiving the caller's telephone number in case that the ringing signal is detected by the detecting means. The apparatus may also include generating means for generating the voice message according to the caller's telephone number received by the receiving means, and outputting means for outputting the generated voice message through a speaker in case that another ringing signal is detected by the detecting means.

13 Claims, 2 Drawing Sheets

APPARATUS AND METHOD OF GENERATING VOICE MESSAGE OF CALLER'S NUMBER IN CASE OF INCOMING CALL IN TELEPHONE

CLAIM OF PRIORITY

The present application is based, refers to, incorporates the same herein, and claims all benefits accruing under 35 U.S.C §119 from my application entitled *Apparatus and Method of Generating Voice Message of Caller's Number in Case of Incoming Call in Telephone* earlier filed in the Korean Industrial Property Office on the 22nd day of December 1995, and there duly assigned Ser. No. 54743/1995 by that Office.

BACKGROUND OF THE INVENTION

1. Field of the Invention

The present invention relates generally to an apparatus and method of generating an audio frequency call sound in a telephone and, more particularly, to an apparatus and method of generating a voice message when there is an incoming call in the telephone.

2. Description of the Related Art

As the technology of communications is being developed, machineries for communication tend to be personalized and customized. This has led to various ways of generating a call sound in a telephone used at home or office. In a telephone according to a contemporary practice, a ringing sound is generated by the telephone after a ringing signal is detected from an exchange system. A user recognizes that there is an incoming call from an exchange system after hearing a ringing sound that is sent out through a speaker, and picks up a handset to converse with the caller.

Among the exemplars of the related arts are Lewis (U.S. Pat. No. 5,574,777, *Caller ID And Call Waiting For Multiple CPEs On A Single Telephone Line,* Nov. 12, 1996) discussing a system for allowing a plurality of customer premise equipments on a single telephone line to display a third party's caller information while users are communicating with a second party. Draganoff (U.S. Pat. No. 5,541,988, *Telephone Dialler With A Personalized Page Organization Of Telephone Directory Memory,* Jul. 30, 1996) discusses a telephone dialer with a personalized page organization of telephone directory memory. The system simplifies the use of the telephone directory by using a single sliding or rotary key for scanning and selection of the name and number to be dialed and one button for speed dialing of the selected number. Robinson et al. (U.S. Pat. No. 5,533,102, *Telephone Auto Attendant System For Delivering Chosen Greetings To Callers While On The Phone,* Jul. 2, 1996) discusses a method and apparatus for providing a telephone user with a caller ID. The call by the caller causes information concerning the caller to be transferred over a communication channel, separate from the one used by the telephone user, connected to a PC located near the telephone user. Luneau (U.S. Pat. No. 5,524,406, *Calling Party Announcement Apparatus,* Jun. 11, 1996) discusses a calling party announcement apparatus that provides the identify of the caller in synthesized human speech after the called party has answered the telephone call. The invention captures the incoming caller line identification signal while the telephone is ringing. Klausner et al. (U.S. Pat. No. 5,524,140, *Telephone Answering Device Linking Displayed Data With Recorded Audio Message,* Jun. 4, 1996) discusses a telephone answering device including a means of intelligently organizing voice messages, associated entered codes such as personal IDs and home telephone numbers, and information stored in the memory of the TAD. Ohashi et al. (U.S. Pat. No. 5,481,595, *Voice Tag In A Telephone Auto-Dialer,* Jan. 2, 1996) discusses a portable telephone comprising a data memory having a plurality of data storage locations for storing telephone numbers used to initiate telephone calls as an auto-dialer function. An auto memory is also discussed which comprises a plurality of audio storage location, each of which may be linked to one of the data storage locations. Nixon et al. (U.S. Pat. No. 5,475,743, *System And Method For Processing Telephone Numbers,* Dec. 12, 1996) discusses a system and method using canonical telephone numbers which allows automatic calling with any location in the world independent of the caller's location. The caller canonical telephone number and a plurality of caller prefixes are stored within the system. A telephone directory stores aplurality of callee canonical telephone numbers for locations throughout the world. Vanden Heuvel et al. (U.S. Pat. No. 5,426,422, *Method And Apparatus For Quick Access To Selected Updated Information In A Selected Call Receiver,* Jun. 20, 1996) discusses a method and apparatus for quick access to selected updated information in a selective call receiver. A memory stores the personal messages in a first portion and the database messages as a plurality of screens in a second portion 48. A screen displays the plurality of screens for the user's perusal.

SUMMARY OF THE INVENTION

Accordingly, an object of the present invention is to provide an improved method and an improved apparatus for generating an audible voice message alerting a caller ID in view of a phone ring in a telephone.

A further object of the present invention is to provide an improved method and an improved apparatus for generating an audible voice message in response to an incoming call in a telephone.

A still further object of the present invention is to provide a method and a apparatus for generating a voice message for a caller's number instead of a phone ring an incoming call in a telephone.

A yet another object of the present invention is to provide a method and apparatus of generating a voice message for a caller's telephone number instead of a phone ring when there is an incoming call in the telephone so as to remove the inconvenience of moving to the telephone.

These and other objects of this invention may be attained with a process and an apparatus for generating a voice message for a caller's telephone number in case of an incoming call in a telephone. The apparatus may include a ring detector for detecting a ringing signal, and receiving means for receiving the caller's telephone number when the ringing signal is detected. The apparatus may also include a voice generator for generating a voice message according to the caller's telephone number, and for outputting the generated voice message through a speaker to alert a user of a caller ID.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

With reference to the attached drawings, the present invention will be described below in detail. Recently, there is provided a technology that the exchange offers a caller identification (ID) for the purpose of identifying the caller's number. In a telephone having a function of identifying the caller's number after receiving the caller ID offered from the exchange in case of the incoming call, the user can identify the caller's telephone number through the number displayed at a display unit such as a liquid crystal display. In a telephone having the function of identifying the caller's telephone number, the user must physically attend to the telephone in order to get the number from the display unit of the telephone. As shown below, this can be rectified.

Figure 1:
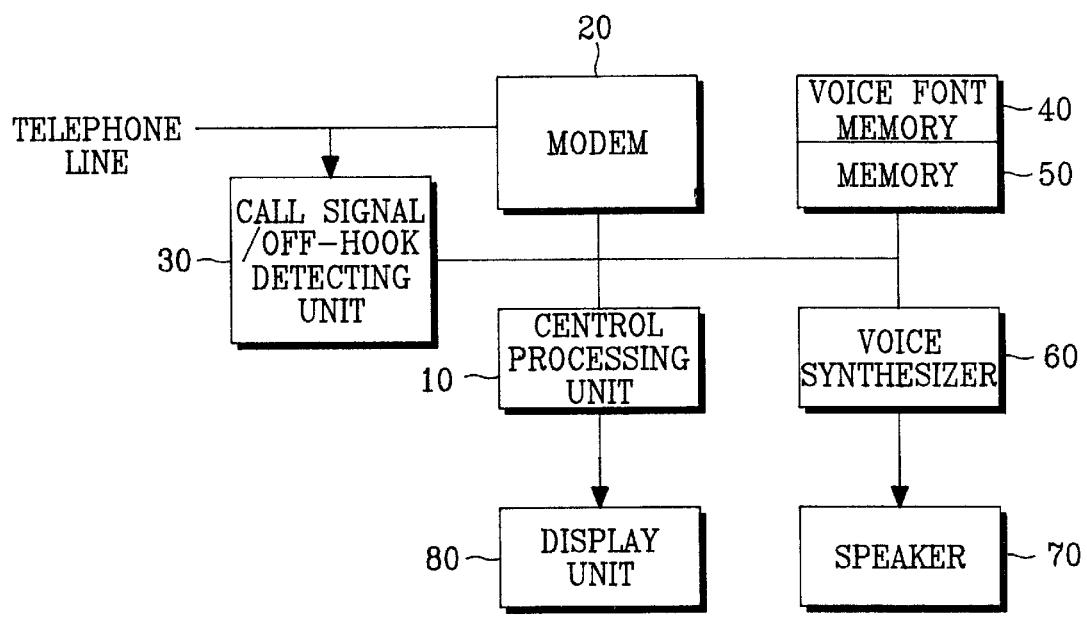
FIG. 1 is a block diagram of a portion of a telephone built according to the principles of the present invention.

Turning now to the drawings, as shown in FIG. 1, a telephone of the present invention may include a central processing unit (CPU) 10 for controlling the output of a voice message for a caller's telephone number after receiving a call signal, a modem 20 for detecting the caller's telephone number received from a subscriber's line by the control of the CPU 10 and demodulating the detected caller telephone number, and a call signal/off-hook detecting unit 30 for detecting a call signal and a state of communication from the subscriber's line. Also, the telephone may include a voice font memory 40 for storing various tuning bars, a memory 50 for storing a list of callers' telephone numbers and their name, or firm names, a voice synthesizer 60 for reproducing the voice message under the control of the CPU 10, a speaker 70 for outputting a sound after converting an electric voice signal reproduced by the voice synthesizer 60 to the sound, and a display unit 80 for displaying various kinds of information as well as the telephone number under the control of the CPU 10.

With reference to the appended drawings, the preferred embodiment of the present invention will be described below in detail. A telephone of the contemporary practice generates a ringing sound if a ringing signal is received. By comparison, the present invention informs the user that there is an incoming call by sending out a voice message instead of a phone ring. In order to inform an incoming call using the voice message, a predetermined voice message must be stored in the memory 50. For example, a prerecorded voice message such as "there is a call from (someone) whose number is XXX-XXXX." is stored in the memory, and then the part of caller's telephone number and name among the voice message can be changed according to the telephone number detected from the subscriber's line. The caller ID is transmitted between ringing signals from the exchange or in the following a polarity reverse signal (PRS). The ringing signal or the PRS must be detected in order to detect the caller ID.

Figure 2:
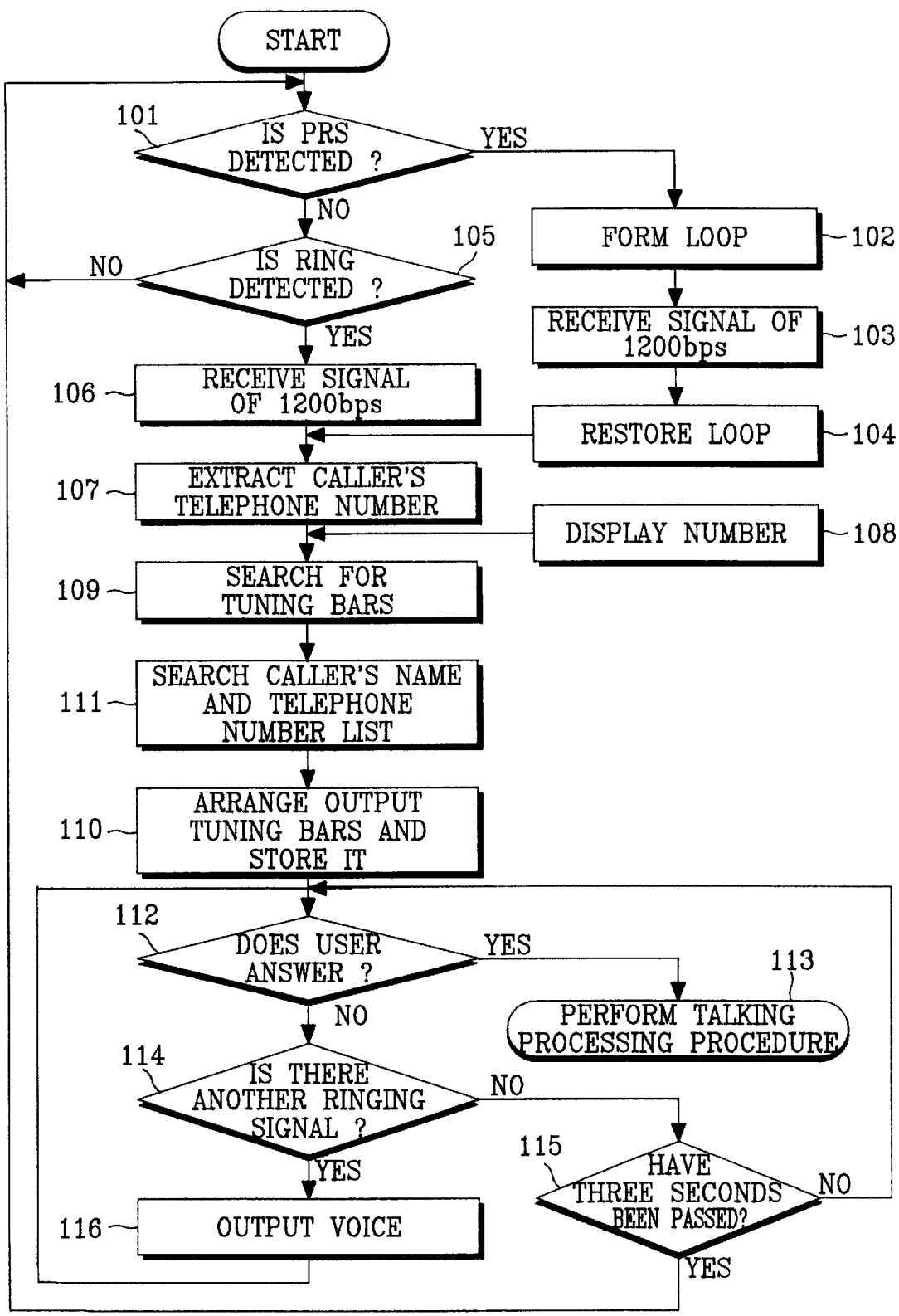
FIG. 2 is a flow chart showing a control of sending out a voice message about a state of reception in case of an incoming call, in accordance with the principles of the present invention.

As shown in FIG. 2, the CPU 10 decides whether the PRS is detected by the call signal/off-hook detecting unit 30 (in step 101). If the PRS is detected, the CPU 10 will form a talking loop in step 102, receive a frequency shift keying (FSK) of 1200 bps containing the caller ID (in step 103), and restore the loop in order to receive the ringing signal (in step 104).

If the PRS is not detected in the step 101, it will be decided whether the ringing signal is detected (in step 105).

If the ringing signal is detected, the CPU 10 will receive the FSK of 1200 bps containing the caller ID through the modem 20 (in step 106). The CPU 10 extracts the caller's telephone number from the caller ID received from the modem 20 (in step 107). The CPU 10 displays the extracted caller's telephone number at the display unit 80 (in step 108). The CPU 10 searches the voice font memory 40 for the tuning bar corresponding to the extracted caller telephone number (in step 109). The CPU 10 searches the list of caller's name and telephone number registered in the memory 50 (in step 110). The CPU 10 temporarily stores the tuning bar corresponding to caller's telephone number in the memory 50 after arranging and repeating it (in step 111). The CPU 10 decides whether the user picks up the telephone after hearing the call signal (in step 112). If the user picks up the phone, the CPU 10 will perform a talking processing procedure (in step 113).

If the user does not pick up the phone, the CPU 10 will decide whether the ringing signal is detected (in step 114). When the ringing signal is not detected in the step 114, the CPU 10 decides whether the predetermined time, three seconds, has been passed (in step 115). If three seconds have not been passed, the progression will be continued after coming back to the step 112. If three seconds have been passed, it is decided that the caller cancels the call, or another telephone connected to the common line answers the call, so that all the steps are performed again from the initial step 101. If the ringing signal is detected in step 114, the CPU 10 will control the voice synthesizer 60 so as to send out the voice message such as "There is a call from (someone) whose number is XXX-XXXX." through the speaker 70. The voice message is repeatedly sent out while the ringing signal is provided from the exchange.

Since the voice message for caller's telephone number is generated after the caller ID is received between the ringing signals or after the reception of the PRS (and then the voice message is output when the ringing signal is detected), the user can recognize the caller's name or firm name as well as the caller's telephone number without moving to the telephone.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A telephone system for generating an audible voice message for announcement in lieu of a standard ring tone to inform a user of an identity and telephone number of a caller of an incoming call, comprising:

a ring detector connected to a telephone line from a central exchange, for detecting a first and a second ring signal indicating an incoming call;

a receiver for receiving a caller identification of the incoming call when the first ring signal is detected;

a message generator for generating an audible voice message corresponding to the caller identification; and a controller for controlling the transmission of said audible voice message through a speaker for announcement in lieu of a standard ring tone to audibly inform the user of the identity and telephone number of the caller, when the second ring signal is detected.

2. A telephone system for generating an audible voice message for announcement in lieu of a standard ring tone to inform a user of an identity and telephone number of a caller of an incoming call, comprising:

a ring detector for detecting a first and a second ring signal from an exchange;

a receiver for receiving a caller identification of the incoming call from said exchange, when the first ring signal is detected;

a message generator for generating an audible voice message corresponding to the caller identification received from said exchange; and a transmitter for transmitting said audible voice message through a speaker for announcement in lieu of said standard ring tone to audibly inform the user of the identity and telephone number of the caller, when said second ring signal is detected.

3. The telephone system of claim 2, wherein said audible voice message is generated by the steps of:

when said first ring signal is detected, receiving the caller identification of the incoming call from said exchange;

generating said audible voice message containing the identity and telephone number of the caller in accordance with the caller identification; and when said second ring signal is detected after generating said audible voice message, transmitting said audible voice message through said speaker for announcement in lieu of said standard ring tone.

4. The telephone system of claim 3, wherein the caller identification is received between consecutive ring signals, and the telephone number of the caller is extracted from the caller identification.

5. The telephone system of claim 2, further comprising a display unit for providing a visual display of the telephone number of the caller.

6. The telephone system of claim 5, wherein said audible voice message is generated by the steps of:

when said first ring signal is detected, receiving the caller identification of the incoming call from said exchange;

generating said audible voice message corresponding to the caller identification; and when said second ring signal is detected after generating said audible voice message, transmitting said audible voice message through a speaker for announcement in lieu of said standard ring tone.

7. The telephone system of claim 6, wherein the caller identification of the incoming call is received from said exchange, and the telephone number of the caller is extracted from the caller identification.

8. A telephone system for generating an audible voice message for a telephone number of a caller, comprising:

a signal detector for detecting a polarity reverse signal or a first ring signal;

a central processing unit for receiving a frequency shift keyed signal containing caller identification after forming a talking loop when the polarity reverse signal is detected;

a loop restorer for restoring the talking loop after reception of the caller identification by said central processing unit;

a modem for providing a frequency shift keyed signal to said central processing unit when said signal detector detects said first ring signal, said frequency shift keyed signal including said caller identification;

a telephone number extractor for extracting the telephone number of the caller from the received caller identification;

a message generator for generating an audible voice message according to the telephone number of the caller that has been extracted; and a transmitter for transmitting said audible voice message through a speaker for announcement in lieu of a standard ring tone to audibly inform a user of the identity of the caller, when a second ring signal is detected by the signal detector.

9. The telephone system of claim 8, further comprising a display unit for providing a visual display of the telephone number of the caller extracted from the caller identification.

10. A method of generating a voice message for a telephone number of a caller of an incoming call in a telephone, the method comprising the steps of:

determining whether a polarity reverse signal is detected;

forming a talking loop, when it is determined that said polarity reverse signal is detected;

determining whether a first ring signal is detected when it is determined that said polarity reverse signal is not detected;

receiving a caller identification after forming said talking loop or after determining that said first ring signal is detected;

after receiving the caller identification, restoring the talking loop if said talking loop is formed in said forming step;

extracting the telephone number of the caller from the caller identification that has been received;

generating a voice message according to the telephone number of the caller that has been extracted; and determining if a second ring signal is detected after generating the voice message;

determining whether three seconds have passed when it is determined that said second ring signal has not been detected after generating the voice message; and transmitting the voice message through a speaker, when it is determined that said second signal is detected.

11. The method as set forth in claim 10, further comprising a step of displaying said telephone number of said caller on a display unit of said telephone.

12. The method as set forth claim 10, further comprising a step of determining whether a user answers said telephone prior to said step of determining whether said second ring signal is detected.

13. The method as set forth claim 11, further comprising a step of determining whether said telephone is answered prior to said step of determining whether said second ring signal is detected.

* * * * *